(12) United States Patent
Tseng (10) Patent No.: US 6,379,039 B1
(45) Date of Patent: Apr. 30, 2002

(54) COST-EFFECTIVE ELECTRONIC THERMOMETER

(75) Inventor: Daniel Chao-Man Tseng, Taipei (TW)

(73) Assignee: K-Jump Health Co., Ltd., Taipei (TW)

( * ) Notice: Subject to any disclaimer, the term of this patent is extended or adjusted under 35 U.S.C. 154(b) by 0 days.

(21) Appl. No.: 09/579,986

(22) Filed: May 26, 2000

Related U.S. Application Data (63) Continuation-in-part of application No. 08/967,776, filed on Nov. 12, 1997, now Pat. No. 6,068,399.

(51) Int. Cl.⁷ .............................. G01K 7/00; G01K 1/00
(52) U.S. Cl. ....................... 374/163; 374/208; 374/170; 374/183
(58) Field of Search ................ 374/163, 170, 374/183, 208

(56) References Cited

U.S. PATENT DOCUMENTS

| | | | | |
|---|---|---|---|---|
| 2,321,846 A | * | 6/1943 | Obermaier ................. | 374/208 |
| 3,822,598 A | * | 7/1974 | Brothers et al. ............ | 374/183 |
| 4,128,007 A | | 12/1978 | Ulin ............................ | 73/352 |
| 4,174,631 A | | 11/1979 | Hammerslag ............... | 73/359 |
| 4,183,248 A | * | 1/1980 | West ......................... | 374/170 |
| 4,444,517 A | | 4/1984 | Murase ...................... | 374/188 |
| 4,572,213 A | | 2/1986 | Kawahara .................. | 128/736 |
| D287,473 S | | 12/1986 | Ueno ........................ | D10/57 |
| D287,829 S | | 1/1987 | Osaka ........................ | D10/57 |
| 4,688,949 A | | 8/1987 | Hatakenaka ................ | 374/183 |
| 4,729,672 A | | 3/1988 | Takagi ....................... | 374/208 |
| 4,743,121 A | | 5/1988 | Takagi et al. ............... | 374/163 |
| D298,219 S | | 10/1988 | Muller ....................... | D10/57 |
| D309,866 S | | 8/1990 | Fukuda et al. .............. | D10/49 |
| 5,013,161 A | | 5/1991 | Zaragoza et al. ........... | 374/208 |
| 5,133,606 A | * | 7/1992 | Zaragoza et al. ........... | 374/208 |
| 5,165,798 A | | 11/1992 | Watanabe ................... | 374/208 |
| D337,533 S | | 7/1993 | Zaragoza .................... | D10/57 |
| 5,401,100 A | | 3/1995 | Thackston et al. .......... | 374/208 |
| 5,439,124 A | * | 8/1995 | Mock ......................... | 215/40 |
| 5,575,563 A | | 11/1996 | Chiu et al. .................. | 374/141 |
| 5,988,313 A | * | 11/1999 | Håkansson ................. | 181/135 |
| 6,074,090 A | * | 6/2000 | Chen ......................... | 374/183 |
| 6,264,870 B1 | * | 7/2001 | Håkansson ................. | 264/255 |

* cited by examiner

*Primary Examiner*—Randy W. Gibson
(74) *Attorney, Agent, or Firm*—Olson & Hierl, Ltd.

(57) ABSTRACT

A cost-effective electronic thermometer comprises a rigid case attached to a flexible probe stem in a lap joint. The distal end portion of the relatively rigid case is affixed to the flexible probe stem at the lap joint by a molding weld between the case and the flexible probe. A substantially rigid insert is positioned partially within an axially extending passageway defined by the stem such that a sensor cap can be mounted around the insert. A temperature sensor in sensor cap is connected to an electronic processor with display that is positioned within case and powered by a battery.

12 Claims, 7 Drawing Sheets

COST-EFFECTIVE ELECTRONIC THERMOMETER

RELATED APPLICATION

This application is a continuation-in-part application of U.S. patent application Ser. No. 08/967,776 filed on Nov. 12, 1997, now U.S. Pat. No. 6,068,399.

TECHNICAL FIELD OF THE INVENTION

The present invention relates to an electronic thermometer for detecting and digitally displaying a body temperature. More particularly, the present invention pertains to a cost-effective electronic thermometer with a flexible probe.

BACKGROUND OF THE INVENTION

Hand held electronic thermometers offer many advantages over glass-tube mercury thermometers. In the basic electronic thermometer design, a temperature sensing element is connected to a combined, battery-powered computing and display element. These components are housed in a rigid plastic case having a probe with handle shape. The temperature sensing element is mounted at the end of the probe section and covered with a metal cap. The computing and display element as well as the battery are secured in the handle section of the rigid case, where a viewing window is provided for the temperature display and an access door is provided for the battery. The components are interconnected by wires or leads.

Although such thermometers have enjoyed wide-spread commercial acceptance since the 1970s, efforts at improvement on this basic design continued. To date, numerous advancements have been made. These advancements include mouth-friendly flexible probes, fast-response sensing elements, and audible signaling.

Concerning improvements in probe flexibility for example, U.S. Pat. No. Des. 254,189 to Prosky illustrates a relatively early design of an electronic thermometer with a flexible probe. Giving a somewhat later design, U.S. Pat. No. 5,165,798 to Watanabe also depicts a hand-held electronic thermometer with a flexible probe.

Efforts at improving measurement response times are reflected in U.S. Pat. No. 4,688,949 to Hatakenaka. This patent is directed to a customized multi-layer temperature sensor designed for use in a hand-held thermometer. Infrared-based thermometers having ear probes have also been developed in an effort to further reduce response time. See for example, U.S. Pat. No. 4,993,424 to Suszynski et al.

While offering desirable features, these "improved" thermometers all suffer at least one serious drawback: they are very expensive to fabricate.

The flexible-probe feature, in particular, adds greatly to the costs of production. As U.S. Pat. No. 5,165,798 to Watanabe well demonstrates, the conventional flexible design is multi-piece and multi-layer, requiring a flexible tube mounted to a rigid case with an elastomeric cover surrounding the tube and cover.

So far, faster response times have also come only at greater expense in production. One of many available examples, the fabrication process described for the fast-response probes of U.S. Pat. No. 4,688,949 to Hatakenaka is a multi-step recipe including multiple high temperature baking steps and a laser trimming step. And while said to be fast in their response, the infrared ear probe thermometers are well known to be not only more expensive to make but also less accurate.

To be commercially successful, medical devices designed for the price-sensitive consumer market must be advanced in features but still inexpensive to fabricate. Accordingly it would be desirable to provide an improved hand-held electronic thermometer having a cost-effective design. Specifically, it would be desirable to provide the advantages of the more-expensive flexible probe and fast-response designs without the excessive fabrication costs.

SUMMARY OF THE INVENTION

A hand-held electronic thermometer having a one-piece flexible probe and a fast-response temperature sensor system is provided for clinical use. Its innovative and elegant design allows for such advanced features at reduced cost.

Specifically, this device includes a flexible monolithic probe stem attached by a lap joint to the distal end of a relatively rigid case. Extending away from the case, the flexible probe stem is tapered outwardly in both width and thickness. A temperature sensor is positioned within a sensor cap mounted at the distal end of the probe stem such that the temperature sensor and sensor cap are in thermal communication.

The temperature sensor is operably associated with an electronic processor, which is in turn operably associated with a digital display and an energizing power source. The electronic processor, the digital display, and the power source are positioned within the relatively rigid case.

The digital thermometer is configured for quick assembly. The rigid case optionally includes top and bottom sections joined across an O-ring seal that is unitary with the probe stem. Furthermore, the temperature sensor may be attached to an isolated region of the sensor cap to reduce measurement response time.

In one embodiment of the present invention, the distal end portion of the relatively rigid case is affixed to the flexible probe stem at the lap joint by a molding weld between the case and the flexible probe. This embodiment preferably includes a substantially rigid insert positioned partially within an axially extending passageway defined by the stem such that sensor cap is mounted around the insert.

DESCRIPTION OF PREFERRED EMBODIMENTS

While this invention is satisfied by embodiments in many different forms, there is shown in the drawings and will be described herein in detail specific embodiments of the invention with the understanding that this disclosure is to be considered a demonstration of the principles of the claimed invention and is not to be limited to the specific embodiments illustrated.

Adverting to FIGS. 1 through 5, an electronic thermometer 10 comprises a probe stem 12 extending outwardly from a case 14. Probe stem 12 is monolithic, flexible and tapered outwardly from case 14 in both width and thickness. Case 14 is substantially rigid and includes a top section 16 and a bottom section 17. A lap joint 18 links probe stem 12 to case 14 and forms an interlocking water-tight seal.

Electronic thermometer 10 also includes a temperature sensor 20 in the form of a temperature-responsive element such as a thermistor or thermocouple. Temperature sensor 20 converts ambient temperature into an electronic signal. A sensor cap 22 mounted at the distal end of probe stem 12 surrounds and protects temperature sensor 20. Sensor cap 22 is made from a thermally conductive material such as stainless steel, aluminum or the like. Temperature sensor 20 attaches to sensor cap 22 such that these elements are in thermal communication. Although optional, a thermally conductive adhesive material 23 (or potting compound) such as a thermally conductive epoxy can be used to attach temperature sensor 20 to sensor cap 22.

Figure 1:
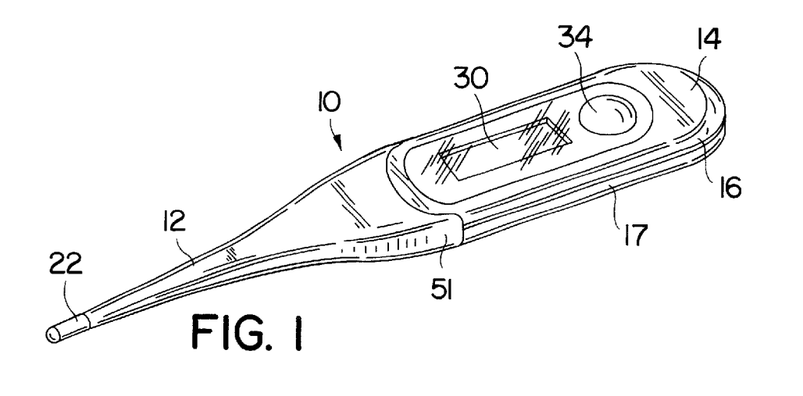
FIG. 1 is a perspective view of an electronic thermometer embodying the features of the present invention.
Figure 2:
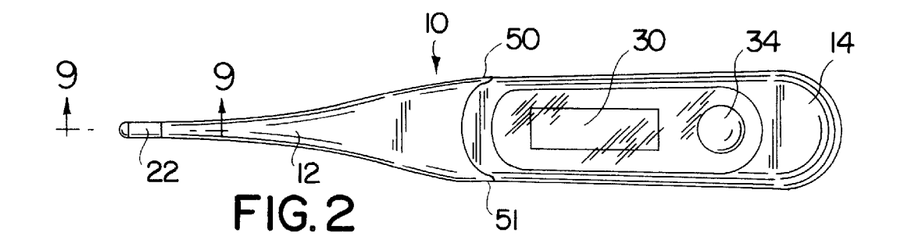
FIG. 2 is a top plan view of the thermometer of FIG. 1.
Figure 3:
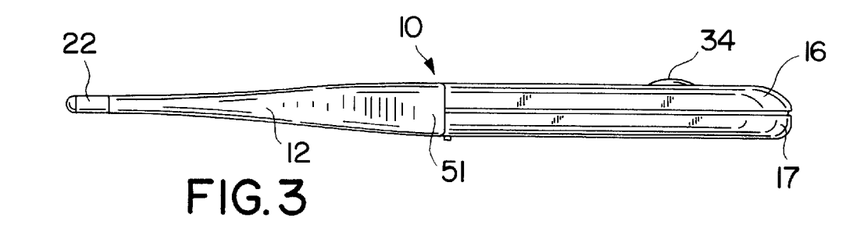
FIG. 3 is a side elevation view of the thermometer of FIG. 1.
Figure 4:
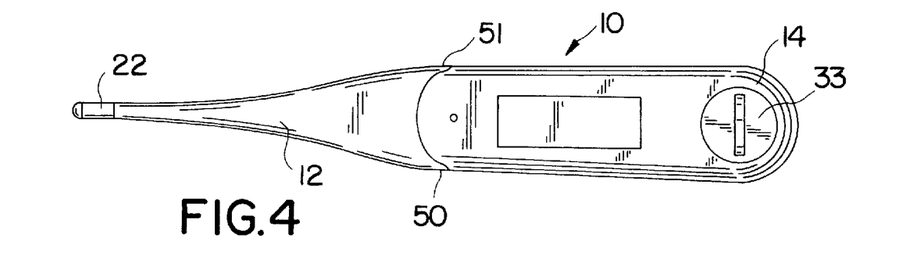
FIG. 4 is a bottom elevation view of the thermometer of FIG. 1.
Figure 5:
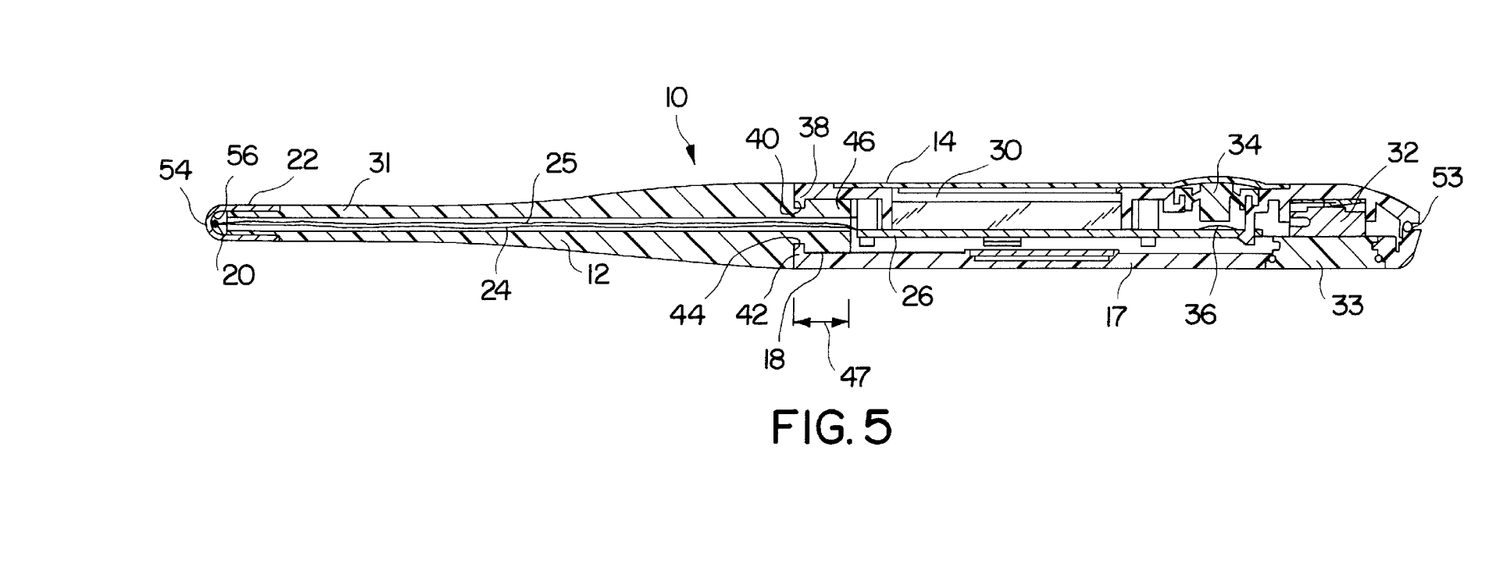
FIG. 5 is an enlarged vertical cross-sectional view of the electronic thermometer of FIG. 1.

Temperature sensor 20 is electrically connected by conductors 24 and 25 to a printed circuit board module 26 that includes, in combination, an electronic processor (dispersed on module 26) operably associated with a digital display 30. As shown in FIG. 5, conductors 24 and 25 extend through an axially extending passageway 31 defined in probe stem 12. Axially extending passageway 31 could also be called a conductor passageway. However, probe stem 12 could also be solid. For example, conductors 24 and 25 could be encased in probe stem 12 without a defined passageway.

Printed circuit board module 26 converts electric signals from temperature sensor 20 into digital signals. The digital display 30 then serves to display a numeric read-out of the temperature detected.

A power source 32, preferably a battery, energizes printed circuit board module 26 and its electronic processor. Removable cover 33 allows access to power source 32. A push-button 34 activates a power switch 36 that is optionally positioned on printed circuit board module 26. Power switch 36 controls electrical connection between power source 32 and the electronic processor.

A key feature of the present invention is that the probe stem is one piece (i.e. monolithic). Because of this, electronic thermometers of the present invention are easier and less expensive to assemble than thermometers heretofore available.

The present monolithic design is accomplished without compromises in either structural integrity or seal quality. As shown in FIGS. 5 through 8, probe stem 12 and case 14 are joined by lap joint 18. Lap joint 18 is formed by opposing flanges that extend inwardly at the distal end of case 14, and corresponding mating grooves positioned toward the proximal end of probe stem 12. Specifically, top section 16 of case 14 has a top flange 38 nested in an upper mating groove 40 of probe stem 12, while lower section 17 has a bottom flange 42 nested in lower mating groove 44.

An overlap portion 46 of probe stem 12 extends into case 14 and overlap span 47. Overlap span 47 is preferably at least about 0.1 centimeters, and most preferably at least about 0.4 centimeters.

Figure 6:
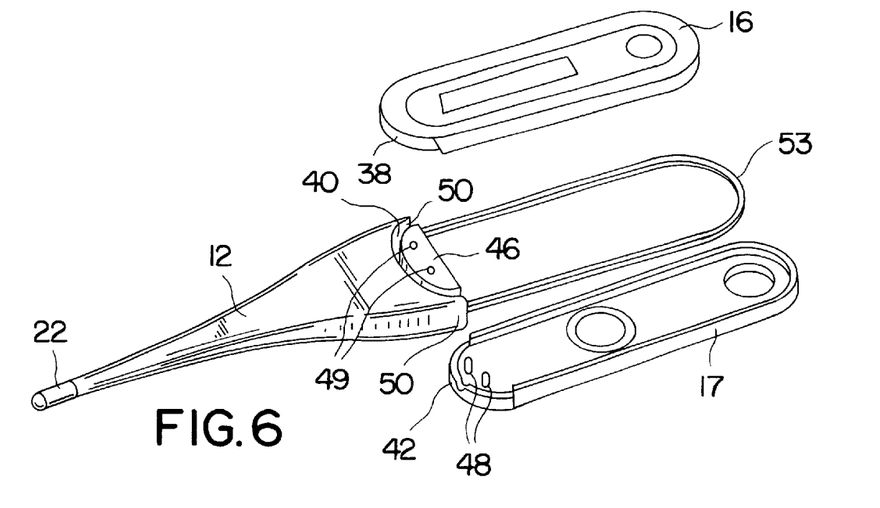
FIG. 6 is an exploded perspective view of the thermometer of FIG. 1 shown without internal components.

As best shown in FIG. 6, flanges 38 and 42 and their corresponding mating grooves 40 and 44 are preferably arcuate, and more preferably have substantially the same radius of curvature as the flange that nest therewithin. While distinct upper and lower mating grooves are shown in the FIGURES, the same function could be accomplished by a continuous mating groove that extends peripherally about the probe stem. Optional connecting pins 48 and corresponding sockets 49 enhance interconnection. Side flaps 50 and 51 of probe stem 12 are also optional, but preferred for enhanced interconnection.

Figure 7:
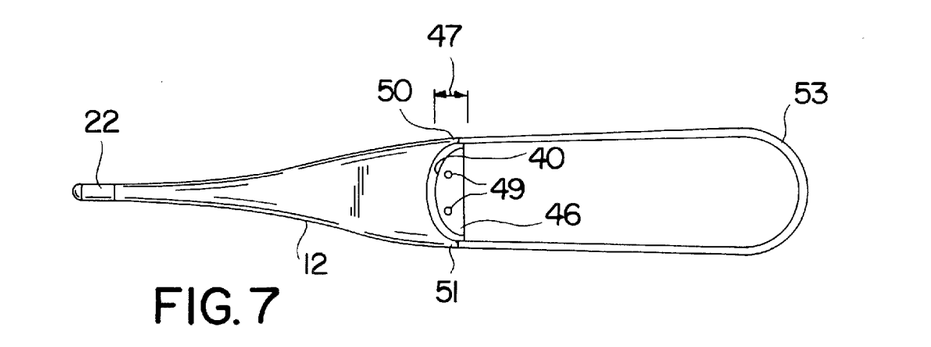
FIG. 7 is a top plan view of a probe stem and O-ring according to the present invention.
Figure 8:
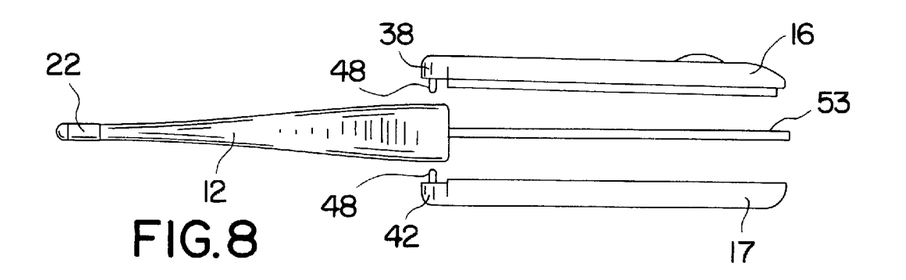
FIG. 8 is an exploded side view of the thermometer of FIG. 1.

In one preferred embodiment of the present invention, an O-ring seal 53 is unitary with probe stem 12 and positioned between top section 16 and bottom section 17 of case 14, as shown in FIGS. 6 through 8. The integrally formed O-ring seal not only provides a low-cost seal but also provides a water-resistant seal and serves to enhance the interconnection between stem 12 and case 14. Specifically, the O-ring seal together with connecting pins further secure the side portions of probe stem 12 (and its optional flaps) to case 14 so as to minimize likelihood of dislodgment.

Figure 9:
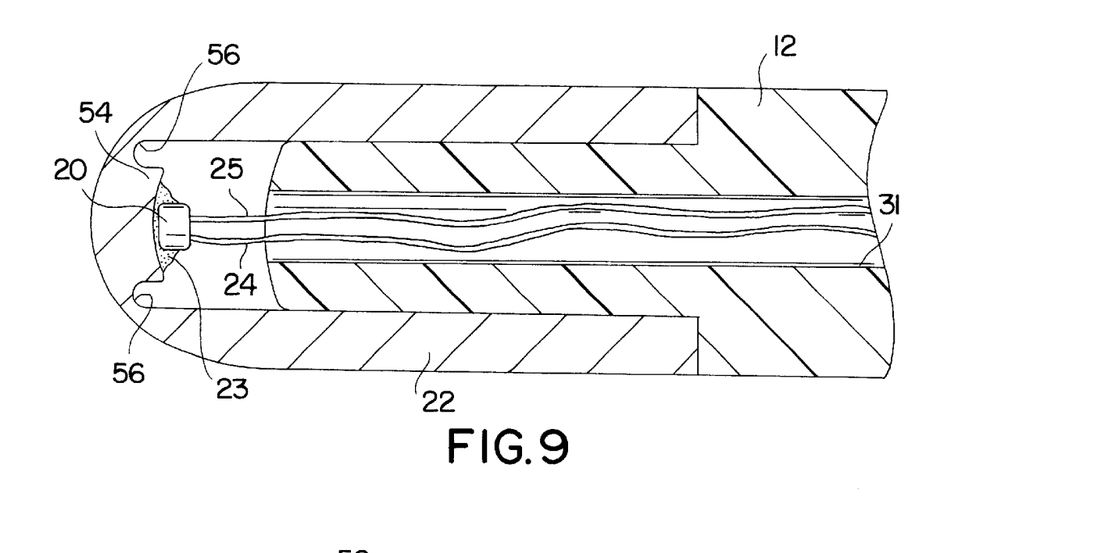
FIG. 9 is an enlarged partial cross sectional view taken along the plane 9—9 in FIG. 2.

Another key feature of the present invention is a reduced heat capacity temperature sensor system. Referring now to FIG. 9, sensor cap 22 includes a thermally isolated region 54 delineated by a groove 56 from the inside surface of sensor cap 22 and defined by a region of reduced cross-sectional area. Temperature sensor 20 is positioned within sensor cap 22 such that temperature sensor 20 is in thermal-communication with thermally substantially isolated region 54 while also at least partially insulated from other portions of sensor cap 20. In other words, sensor cap 22 has a sensor attachment region that is substantially thermally isolated from other portions of the sensor cap and affords a more rapid response.

The thermally isolated region has a substantially lower overall heat capacity than the full sensor cap. Therefore, the temperature of the temperature sensor can more quickly rise to equilibrium with a patients body temperature. Unlike conventional designs for faster response, the present design allows for a fast-response measurement without significantly increasing production cost.

Figure 10:
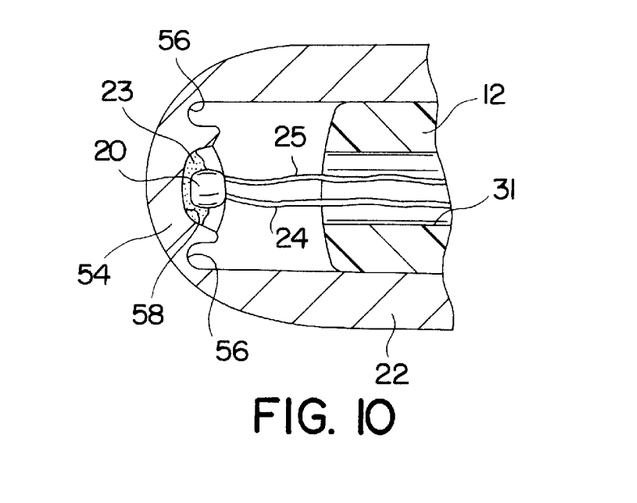
FIG. 10 is an enlarged partial cross sectional view of an assembled temperature sensor with sensor cap according to an alternate embodiment of the present invention.
Figure 11:
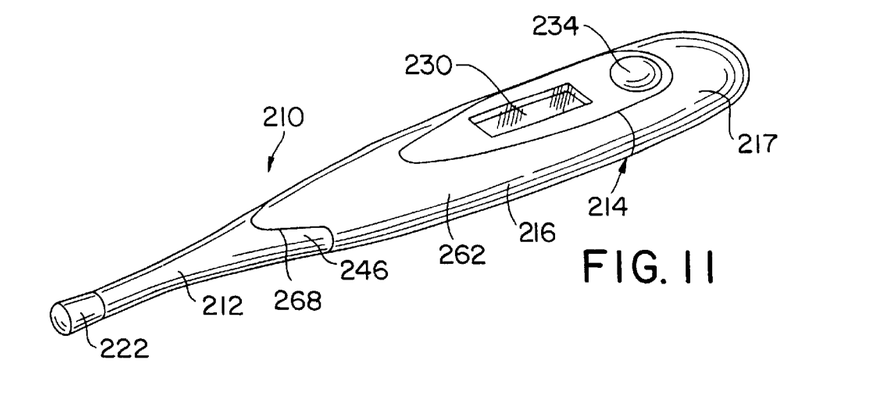
FIG. 11 is a perspective view of another embodiment of an electronic thermometer according to the present invention.
Figure 12:
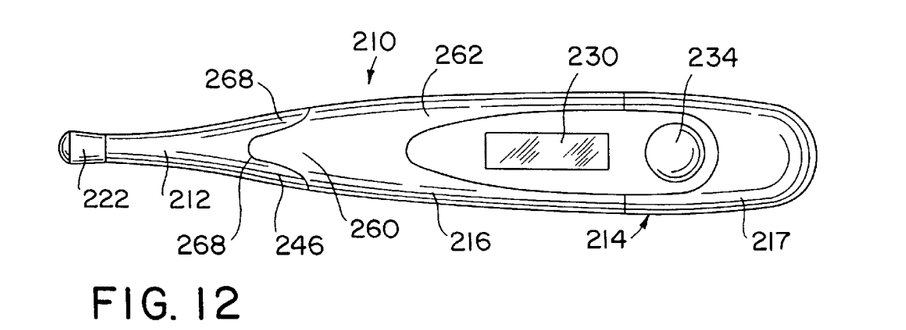
FIG. 12 is a top plan view of the thermometer of FIG. 11.
Figure 13:
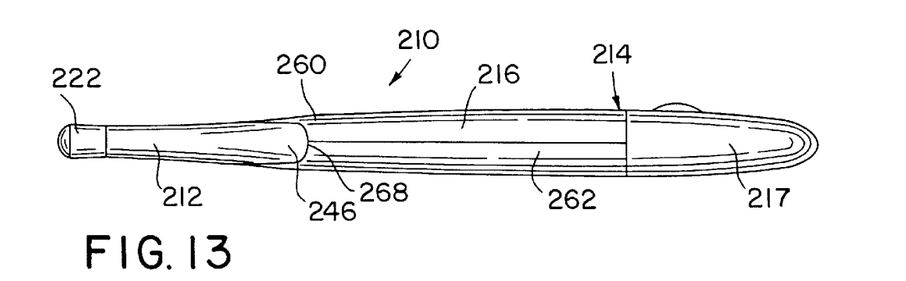
FIG. 13 is a side elevation view of the thermometer of FIG. 11.
Figure 14:
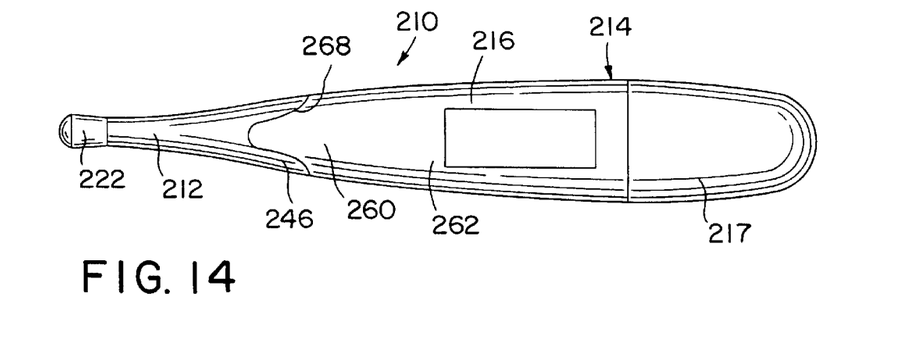
FIG. 14 is a bottom elevation view of the thermometer of FIG. 11.

As noted above, a thermally conductive adhesive (or potting compound) 23 may be used to better secure sensor 20 to region 54. As shown in FIG. 10, attachment can be enhanced by providing a thermally conductive potting compound 23 in region 54 for potting temperature sensor within a cavity 58. This approach carries the added advantage of further reducing overall heat capacity for temperature sensor 20.

A wide variety of materials are suitable for making thermometers of the present invention. These materials include various plastics without limitation that all of the structural elements be made of the same material. Injection molded plastics are generally preferred. The flexible probe stem is made of a soft or pliant plastic. Suitable materials include natural rubber, synthetic rubber, thermoplastics such elastomers, and thermosets such as resilient foam.

FIGS. 11–19 illustrate an alternate embodiment of the present invention, electronic thermometer 210. Electronic thermometer 210 comprises a flexible probe stem 212 affixed to and extending outwardly from case 214. Case 214 is substantially rigid and a subassembly of two subparts: a main section 216 and an proximal end cap 217.

Electronic thermometer 210 also includes a sensor cap 222 containing a temperature sensor (not shown), a conductor passageway 231, a digital display 230, a power button 234 for activating thermometer 210, and internal electronic components as described for thermometer 10 (e.g. circuit board, conductors, battery).

The proximal end of main section 216 includes a retaining sleeve 219 for receiving and retaining end cap 217.

Figure 15:
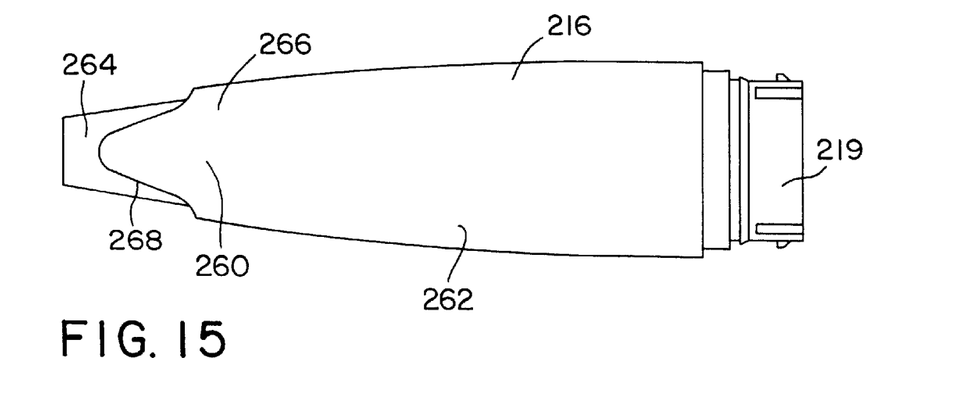
FIG. 15 is a bottom elevation view of a portion of the rigid case subpart for the embodiment of FIG. 11 illustrating the recessed overlay area at the distal end portion of the case.
Figure 16:
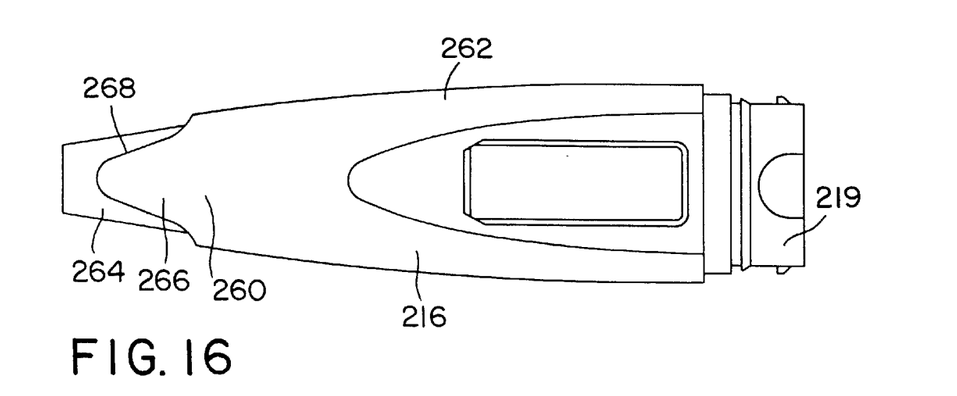
FIG. 16 is a top plan view of the rigid case subpart of FIG. 15.
Figure 17:
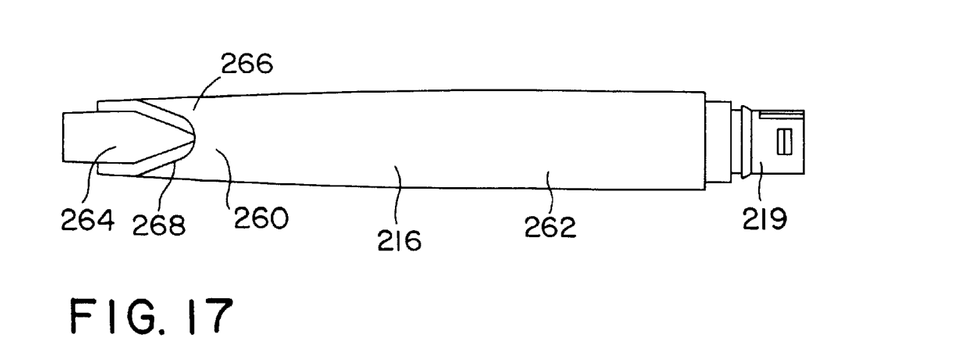
FIG. 17 is a side elevation view of the rigid case subpart of FIG. 15.
Figure 19:
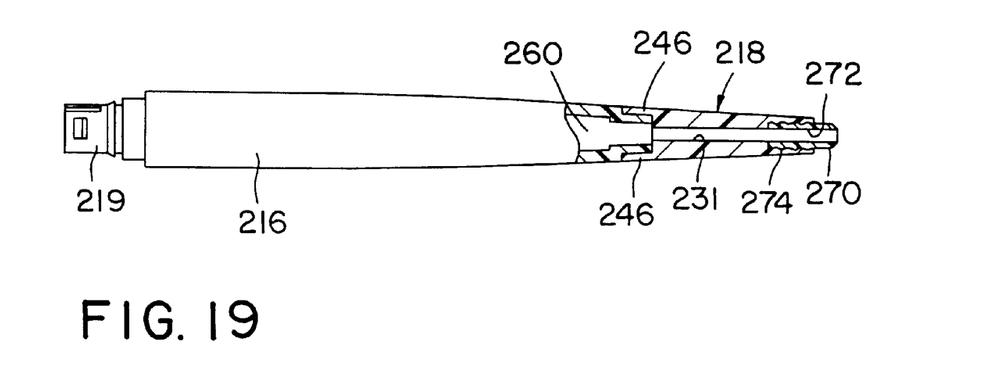
FIG. 19 is a top plane view of the rigid case with probe stem subassembly for the embodiment of FIG. 11.

Flexible probe stem 212 and case 214 are joined by a lap joint, which is identified in FIG. 19 with the reference numeral 218. Lap joint 218 is formed by an overlap portion 246 of probe stem 212 at the distal end portion 260 of case 214. A recess in the outer surface of case 214 is adapted to receive overlapping portions 246 of the flexible probe stem 212. As best illustrated in FIGS. 15 through 17, the outer (or perimeter) surface 262 of case 214 preferably contains a recessed overlay area 264 and an unrecessed surface area 266. A boundary line 268 is defined between the recessed overlay area 264 and the unrecessed area 266. Boundary line 268 may be planar, but is preferably curved such that a portion of the overlay area 264 extends between portions of the unrecessed area 266.

The case and stem portions of lap joint 218 are joined by a molding weld. As used herein, the phrase "molding weld" refers to a thorough interbonding of connected parts such as the type of link formed between two plastic parts which are molded together before complete curing. Such a thorough interconnection may also be labelled a fusion bond.

A molding weld according to the present invention can be formed by utilizing multimaterial injection molding techniques to fabricate case 214 and probe stem 212. Suitable multimaterial injection molding procedures or techniques are known to those skilled in the art under various labels, including multi-shot, dual-shot, co-injection molding, intermolding, and overmolding.

Descriptions of multimaterial injection molding are set forth in Mapleston, Peter, "Multi-Material Injection Saves Time, While Cutting Costs," *Modern Plastics*, Mar. 19, 1994 and U.S. Pat. No. 5,439,124 to Mock, the disclosures of which are incorporated herein by reference to the extent that such disclosures are pertinent and not inconsistent with the present specification.

Thermometers prepared according to the present invention are produced by intermolding different plastic materials for the rigid case 214 and probe stem 212, i.e. a multamaterial injection molding procedure. The preferred approach to multimaterial injection molding of the case-stem combination is to (1) inject plastic material for main case section 216 of case 214 into a suitable mold; (2) partially cool section 216 to ensure that it is adequately mechanically stable to serve as a mold; (3) partly replace the mold used for molding the case with a mold for probe stem 212; (4) and then inject a different plastic material for probe stem 212. According to this approach, the distal end portion 260 of case 214 partly serves as a mold for injection of probe stem 212.

The choice of plastic materials formed and joined in the multimaterial injection molding process may influence the strength of the molding weld between case 214 and probe stem 212. Probe stem 212 is made of a flexible, soft or pliant plastic and case 214 is made of a different, relatively more rigid plastic material. Within this constraint, the combination of plastic materials is preferably selected to increase the strength of the molding weld between case 214 and probe stem 212. Noted in terms of "plastic material for case/plastic material for probe stem," the following plastic material combinations are preferred: acrylonitrile butadiene-styrene (ABS)/hydrogenated adhesion rubber and polypropylene/polyolefinic thermoplastic elastomer (TPO). An especially preferred combination is a acrylonitrile-butadiene-styrene (ABS) for case 214 and hydrogenated adhesion rubber such as hydrogenated acrylonitrile butadiene rubber for stem 212.

Figure 18:
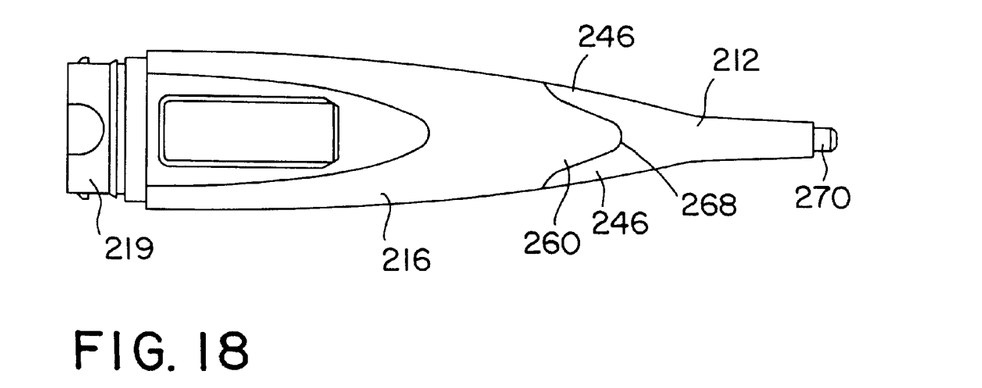
FIG. 18 is partial cross sectional view of the rigid case with probe stem subassembly for the embodiment of FIG. 11.

A preferred embodiment of thermometer 210 includes a substantially rigid insert 270 positioned partially within conductor passageway 231 and extending away from the distal end of probe stem 212. Insert 270 defines an axially extending passageway 272, through which conductors operably connect a temperature sensor to the electronic components housed in case 214. Insert 270 serves as a support for securely mounting sensor cap 222 at the distal end of thermometer 210.

Insert 270 preferably has a scabrous outer (or perimeter) surface 274 and may be held or secured within passageway 231 of probe stem 212 by mechanical friction. Insert 270 is preferably secured within passageway 231 by a molding weld as described above. Insert 270 is made from materials selected for intermolding compatibility with probe stem 212. Where probe stem 212 is made of hydrogenated acrylonitrile butadiene rubber, insert 270 is preferably an acrylonitrile-butadiene-styrene (ABS).

Numerous variations and modifications of the embodiments described above may be effected without departing from the spirit and scope of the novel features of the invention. It is to be understood that no limitations with respect to the specific system illustrated herein are intended or should be inferred. It is, of course, intended to cover by the appended claims all such modifications as fall within the scope of the claims.

I claim:
1. A clinical thermometer comprising:
   a substantially rigid case having a distal end portion;
   a flexible probe stem having only a proximal end portion attached to said distal end portion of said case by a lap joint formed by an overlap portion in said proximal end portion of said stem and extending away from said distal end portion of said case; said proximal end portion of said probe stem being affixed to said distal end portion of said case at said lap joint by a molding weld;
   a sensor cap mounted to the distal end of said probe stem;
   a temperature sensor positioned within said sensor cap and in thermal communication with said sensor cap;
   a digital display in said case;

an electronic processor in said case operably associated with said temperature sensor and with said digital display to convert a temperature value detected by said temperature sensor into a read-out on said digital display; and a power source operably associated with said processor for energizing the processor.

2. The clinical thermometer of claim 1 wherein the probe stem is affixed to said case by a molding weld between said overlap portion in said proximal end portion of said probe stem and an overlay area defined in the distal end portion of the case.

3. The clinical thermometer of claim 2 wherein said overlay area is a recess formed in the outer surface of said distal end portion of said case such that the outer surface of said distal end portion of said case has a recessed and an unrecessed area.

4. The clinical thermometer of claim 3 wherein the boundary defined between said recessed area and the unrecessed area is substantially planar.

5. The clinical thermometer of claim 3 wherein the boundary defined between said overlap area and the outer surface of said case is partially curved such that a portion of said overlap area extends between portions of unrecessed area.

6. The clinical thermometer of claim 1 wherein the combined length of the probe stem and the sensor cap as measured from the distal end of the probe cap to the farthest extent of the probe stem toward the housing is no more than about 25 percent of the total length of the clinical thermometer.

7. A clinical thermometer comprising:

a substantially rigid case having a distal end portion with an outer surface containing a recessed overlay area;

a monolithic flexible probe stem having only a proximal overlap end portion thereof affixed to the recessed overlay area of the distal end portion of said case in a molding weld and extending away from said distal end portion of said case, said probe stem defining an axially extending passageway;

a substantially rigid insert positioned partially within said passageway and extending away from the distal end of said probe stem;

a sensor cap mounted on said insert;

a temperature sensor positioned within said sensor cap and in thermal communication with said sensor cap;

a digital display in said case;

an electronic processor in said case operably associated with said temperature sensor and with said digital display to convert a temperature value detected by said temperature sensor into a read-out on said digital display; and a power source operably associated with said processor for energizing the processor.

8. The thermometer of claim 7 wherein said probe stem has a width and thickness both tapered outwardly away from said probe stem.

9. The clinical thermometer of claim 7 wherein said case is made of an acrylonitrile-butadiene-styrene (ABS) and said probe stem is made of a hydrogenated acrylonitrile butadiene rubber.

10. The clinical thermometer of claim 7 wherein said insert is affixed to the distal end of said probe stem by a molding weld.

11. The clinical thermometer of claim 7 wherein said insert has a scabrous perimeter surface.

12. A clinical thermometer comprising:

a rigid case having a distal end portion with an outer surface containing a recessed overlay area;

a monolithic flexible probe stem extending away from said housing and having only a proximal overlap end portion thereof affixed to the recessed overlay area of the distal end portion of said case in a molding weld;

a sensor cap mounted to the distal end of said probe stem;

a cap support tube attached at the distal end of said flexible probe stem;

a temperature sensor positioned within said sensor cap and in thermal communication with said sensor cap;

a digital display in said case;

an electronic processor in said case operably associated with said temperature sensor and with said digital display to convert a temperature value detected by said temperature sensor into a read-out on said digital display; and a power source operably associated with said processor for energizing the processor.

* * * * *